United States Patent
Choi

(10) Patent No.: US 7,656,097 B2
(45) Date of Patent: Feb. 2, 2010

(54) BALLAST CONTROL SYSTEM FOR HID LAMP USING ZIGBEE

(75) Inventor: Joong-Kwen Choi, Seoul (KR)

(73) Assignee: GRS Consulting, Inc., Seoul (KR)

( * ) Notice: Subject to any disclaimer, the term of this patent is extended or adjusted under 35 U.S.C. 154(b) by 175 days.

(21) Appl. No.: 11/688,254

(22) Filed: Mar. 19, 2007

(65) Prior Publication Data
US 2008/0218317 A1   Sep. 11, 2008

(51) Int. Cl.
    H05B 37/02    (2006.01)
(52) U.S. Cl. .................. 315/291; 315/355; 362/85
(58) Field of Classification Search .......... 315/284, 315/240, 226, 205, 289, 314, 86, 119, 311, 315/58, 208, 149, 291, 224, 307, 209 R, 308, 315/246, DIG. 4, 219, 360, DIG. 7, 276, 315/247, 82, 225, 244; 313/638, 637; 362/294, 362/263
See application file for complete search history.

(56) References Cited

U.S. PATENT DOCUMENTS

| 3,002,147 A | * | 9/1961 | Wasserman ................ 323/209 |
| 4,443,829 A | * | 4/1984 | Delvy et al. ............. 361/275.3 |
| 6,541,920 B2 | * | 4/2003 | Ueda ....................... 315/169.3 |
| 7,307,542 B1 | * | 12/2007 | Chandler et al. ....... 340/825.52 |

FOREIGN PATENT DOCUMENTS

| KR | 20-1999-0007477 A | 12/2000 |
| KR | 20-0385296 B | 5/2005 |
| KR | 10-2005-0080300 A | 9/2005 |
| KR | 20-0415595 B | 5/2006 |

\* cited by examiner

*Primary Examiner*—Douglas W Owens
*Assistant Examiner*—Jae K Kim
(74) *Attorney, Agent, or Firm*—Steven J. Hultquist; Kelly K. Reynolds; Intellectual Property/Technology Law

(57) ABSTRACT

A control system for an HID lamp, which in one implementation includes a magnetic ballast control system for an HID lamp using Zigbee. A plurality of condensers or choke coils of different capacities is mounted on a magnetic ballast for the lamp, and an electronic switch unit controls illumination according to change of such capacities. RF transmitting/receiving means using a Zigbee-based frequency are employed to turn the HID on and off, and to control illumination through wireless remote communications, thereby achieving considerable energy savings. Operational states of the HID lamp and ballast can be bi-directionally controlled through the communication module, with failures of the HID lamp and ballast automatically detected and notified to users.

9 Claims, 3 Drawing Sheets

BALLAST CONTROL SYSTEM FOR HID LAMP USING ZIGBEE

CROSS-REFERENCE TO RELATED APPLICATION

This application claims priority under 35 USC 119 of Korean Patent Application No. 10-2007-0016657 filed Feb. 16, 2007. The disclosure of said Korean Patent Application is hereby incorporated herein by reference, in its entirety, for all purposes.

BACKGROUND OF THE INVENTION

1. Field of the Invention

The present invention relates to a magnetic ballast control system for a HID lamp using Zigbee, and more specifically, relates to such a control system for a HID lamp, which includes a magnetic ballast for the HID lamp that is mounted with a plurality of condensers or choke coils of different capacities, an electronic switch unit for controlling illumination according to the change of capacities of the plural condensers or choke coils, and RF transmitting/receiving means that use a Zigbee-based frequency, thereby allowing to turn on and off the HID lamp and control the illumination through wireless remote communications.

2. Background of the Related Art

An HID (high intensity discharge) lamp is a high intensity discharge lamp, in which high pressure xenon gas and metallic compounds in an arc tube are excitedly discharged and generate light. The HID lamp, such as a metal halide lamp, high pressure sodium lamp, high pressure mercury lamp, and the like, is lit by a specially designed ballast and a starter that generates instant high pressure. When the HID lamp is lit, electrons and metallic atoms in the arc tube are collided and discharged, and the metallic compounds in the arc tube emit light of a unique color. Since the xenon gas suppresses neighboring ultraviolet rays and electromagnetic waves, the HID lamp generates white light close to natural light, which is not yellow and has good color rendering.

In addition, the HID lamp does not have a filament, and tungsten electrodes for discharge are fixed at both ends inside the arc tube. Therefore, the lamp does not need to be inconveniently replaced due to breaking down of the filament, and the lifespan of the lamp is five times longer than that of a halogen lamp. The HID lamp can stably work at power about 40% lower than that of the halogen lamp, and thus in an aspect of energy saving and environmental conservation, improvement and use of the HID lamp have been spotlighted recently in the industrial lighting equipment market.

When such a HID lamp is lit, the HID lamp is driven by a ballast that applies high pressure more than discharge initiating voltage in the initial stage to start discharge. The ballast for the HID lamp can be roughly divided into a magnetic ballast and an electronic ballast. Since the magnetic ballast does not have a separate control unit, it is advantageous in that the structure is simple, the manufacturing cost is low, and the failure rate is low, but illumination thereof is difficult to control. The electronic ballast can control the illumination in steps by constructing a dimming circuit through voltage control. However, since output voltage of the electronic ballast is low, turning on the lamp is unstable, and the lifespan of the lamp is short. Further, since a large quantity of electronic components is used, the manufacturing cost is high, and the failure rate is also high. Therefore, development of a magnetic ballast that can control illumination is required.

Meanwhile, as lighting equipments are recently emphasized on the aspect of interior, a plurality and a variety of lighting equipments are used even in one space. Further, in the case of an industrial site, even in a single work place, a certain area receives a plenty of sunlight and does not need separate lighting in daytime, whereas certain areas may need 100% or more than a certain level, if not 100%, of illumination even in daytime. Accordingly, illumination of a lamp is controlled in order to save energy that is wasted due to the use of a plurality and a variety of lighting equipments, or to create specific atmosphere as needed. If such illumination control is used to control the illumination of the HID lamp, advantages of saving energy and creating needed atmosphere obtained from the illumination control are added to the advantages that the HID lamp previously has in the aspects of environment and energy, thereby greatly contributing to energy saving and improvement of environmental problems.

Therefore, some companies have developed dimming ballasts that can control illumination of a HID lamp by controlling voltage of an electronic ballast. However, since output voltage is low, there is a problem in that turning on the lamp is unstable, and the lifespan of the lamp is shortened.

In addition, since a conventional HID lamp is lit at an unnecessary time point and maintains the same brightness from early evening to midnight, power is wasted. Since the HID lamp cannot be controlled remotely, power is continuously supplied to the ballast even after the lamp is broken down. Therefore, energy is considerably wasted due to no-load loss, and high voltage sparks are generated in the vicinity of the unlit ballast on a rainy or wet day. Although only the lamp is broken down and the ballast is in a normal state, due to high pressure pulse voltage, the start circuit of the ballast that is in a normal state will also break down in the end.

In order to solve the problems, Korean Utility Model Registration No. 0385296 has contrived an apparatus that is capable of controlling illumination, which receives latitudinal and longitudinal data using a global positioning system (GPS) module, calculates sunrise and sunset times by itself using a sunrise sunset program of a microprocessor, and automatically determines on-off time of a lighting equipment. However, since GPS is used as an apparatus for controlling a lamp, the GPS is disconnected in a bad weather condition, and illumination cannot be effectively controlled. On the other hand, an apparatus proposed by Korean Utility Model Registration. No. 0415595 uses a Zigbee wireless network that consumes low power. However, the Zigbee wireless network is used only to control turning on and off of a lamp, there is a problem in that illumination of the lamp cannot be controlled.

Accordingly, what is desperately needed is development of a ballast control system for a HID lamp, which can control illumination according to neighboring brightness and easily grasp operation and failure status of the lamp and a time to replace the lamp.

Accordingly, the present inventor has ardently tried to solve the problems of conventional techniques, and as a result, developed a control system for a HID lamp, which has a low-priced magnetic ballast for a HID lamp equipped with a plurality of condensers or choke coils of different capacities, an electronic switch unit for controlling illumination according to the change of capacities of the condensers or choke coils, and RF transmitting and receiving means that use a Zigbee-based frequency, and confirmed that the control system is capable of remotely controlling turning on and off and illumination of the HID lamp and easily confirming failure of the lamp and a time to replace the lamp, thereby completing the present invention.

SUMMARY OF THE INVENTION

Therefore, the present invention has been made in view of the above problems, and it is an object of the present invention to provide a magnetic ballast control system for a HID lamp using Zigbee, in which the operation of the HID lamp is remotely controlled, and failure of the HID lamp and the time to replace the HID lamp can be easily confirmed.

To accomplish the above object, the present invention, in one aspect, provides a constant power type magnetic ballast control system for a HID lamp, the system comprising: a management system module for outputting HID lamp control signals on the basis of Zigbee communications; a wireless control module for controlling the HID lamp by bi-directionally communicating with the management system module; and a constant power type magnetic ballast unit provided with a plurality of power factor improving condensers to be selected by the wireless control module, for stably supplying power.

In the present invention, the wireless control module preferably includes a Zigbee wireless module for transmitting and receiving control signals to and from the management system module through bi-directional communications; an application board provided with one or more sensors for detecting a HID lamp state; an electronic switch unit for controlling power applied to the HID lamp according to the signals outputted from the Zigbee wireless module and the application board; and a power supply unit for supplying power to the Zigbee wireless module, the application board, and the electronic switch unit.

In the present invention, the wireless control module preferably further includes an external sensor module provided with one or more sensors for sensing illumination or the movement of people or things.

In the present invention, the Zigbee wireless module preferably includes a CPU control unit being in charge of processing control signals of the HID lamp, for controlling the electronic switch unit according to the signals from the management system module, application board, and external sensor module; a Zigbee communication unit that bi-directionally and wirelessly communicates with the management system module on the basis of Zigbee to transmit the information processed by the CPU control unit; and a rechargeable battery unit for applying power to the CPU control unit and the Zigbee communication unit.

In the present invention, the constant power type magnetic ballast unit is preferably connected with discharge resistors.

In the present invention, the constant power type magnetic ballast unit controls illumination of the HID lamp according to the combination of power factor improving condensers of different capacities.

In another aspect, the present invention provides a choke coil type magnetic ballast control system for a HID lamp, the system comprising: a management system module for outputting HID lamp control signals on the basis of Zigbee communications; a wireless control module for controlling the HID lamp by bi-directionally communicating with the management system module; and an choke coil type magnetic ballast unit provided with a plurality of choke coils to be selected by the wireless control module, for stably supplying power.

In the present invention, the wireless control module preferably includes a Zigbee wireless module for transmitting and receiving control signals or the like to and from the management system module through bidirectional communications; an application board provided with one or more sensors for detecting a HID lamp state; an electronic switch unit for controlling power applied to the HID lamp according to the signals from the Zigbee wireless module and the application board; and a power supply unit for supplying power to the Zigbee wireless module, the application board, and the electronic switch unit.

In the present invention, the wireless control module preferably further includes an external sensor module provided with one or more sensors for sensing illumination or the movement of people or things.

In the present invention, the electronic switch relay of the electronic switch unit operates at a time of 5~50 ms when the illumination of the HID lamp is controlled.

In the present invention, the Zigbee wireless module preferably includes a CPU control unit being in charge of processing control signals of the HID lamp, for controlling the electronic switch unit according to the signals from the management system module, application board, and external sensor module; a Zigbee communication unit that bi-directionally and wirelessly communicates with the management system module on the basis of Zigbee to transmit the information processed by the CPU control unit; and a rechargeable battery unit for applying power to the CPU control unit and the Zigbee communication unit.

In the present invention, the constant power type magnetic ballast unit preferably controls illumination of the HID lamp according to the combination of choke coils of different capacities.

BRIEF DESCRIPTION OF THE DRAWINGS

The above and other objects, features and advantages of the present invention will be apparent from the following detailed description of the invention in conjunction with the accompanying drawings, in which.

DETAILED DESCRIPTION OF THE INVENTION, AND PREFERRED EMBODIMENTS THEREOF

Figure 1:
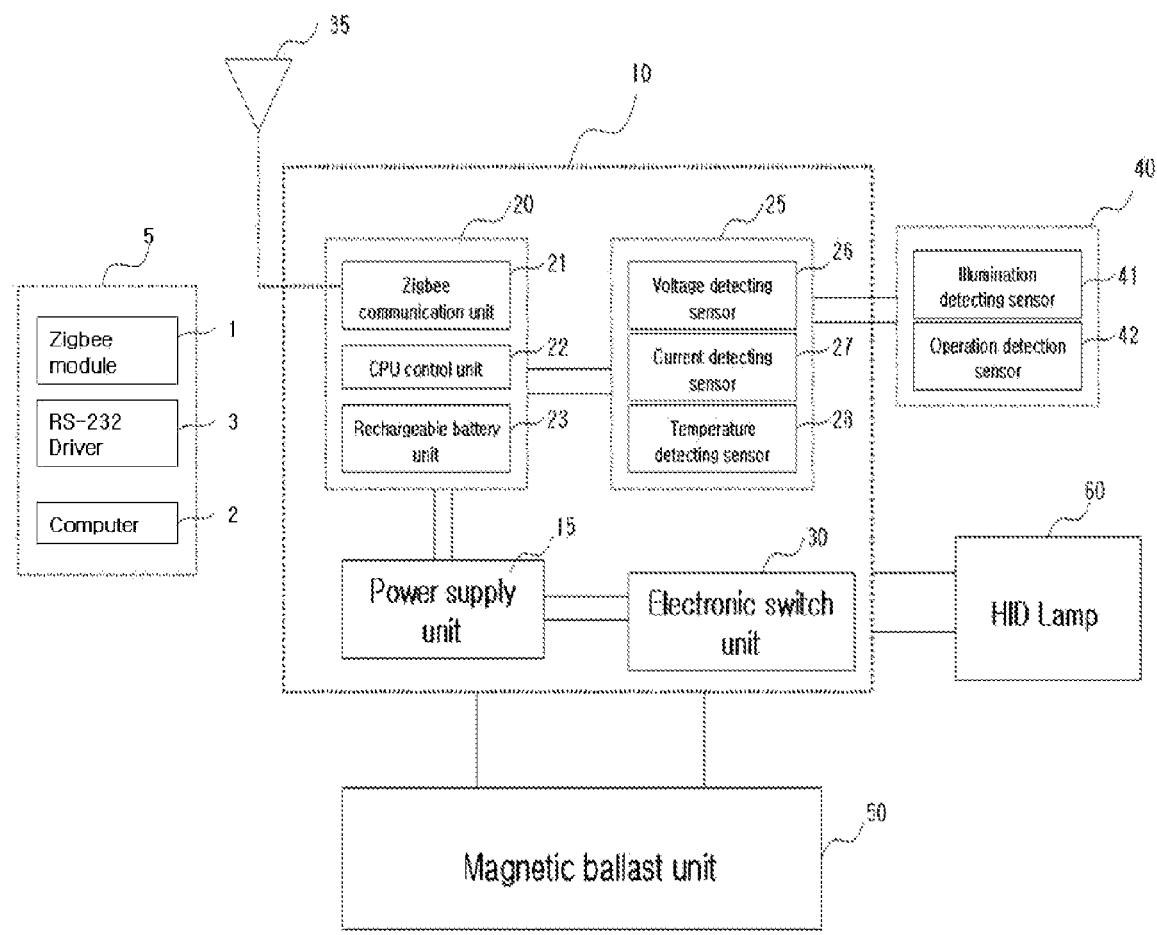
FIG. 1 is a view schematically showing the configuration of a ballast control system for a HID lamp using Zigbee according to the present invention.

The present invention relates to a magnetic ballast control system for a HID lamp, which can turn on and off the HID lamp, control illumination, detect electric leakage and cutoff power supply, and detect failure of the HID lamp, failure of a ballast, temperature, output voltage and current, and the like using the Zigbee wireless communication technique.

The Zigbee according to the present invention is a standard specification for hardware and software based on IEEE 802.15.4. The Zigbee can transmit data at a speed of 20 to 250 kbps over a short distance of 1 to 100 meters. One of the most outstanding features of the Zigbee is low power consumption.

Since idle mode is maintained until an external signal is inputted, and thus power consumption is quite low, and thus a battery can be used for months and years. The Zigbee is further simpler than the Bluetooth or a wireless LAN protocol and thus advantageous in miniaturizing, and the cost of implementing the Zigbee within a system is very low.

In addition, although the Zigbee communication mode is based on a master-slave scheme, point-to-point networking called a mesh mode is also allowed, so that a plenty of equal level devices contained in one bandwidth can bi-directionally communicate with one another. Although the Zigbee is briefly described above, it will be described in further detail below. The Zigbee is a standard technique for a home automation or data network operating in a low transmission speed, which can remotely control a variety of apparatuses with one-button operation. The Zigbee has been started from a desire to conveniently use home automation systems through a telephone connection using the Internet. The IEEE 802.15.4 task force group proceeds standardization of the physical and medium access control layers (PHY and MAC), and the Zigbee alliance proceeds standardization of up to PHY, MAC, data link, network, and application layers. The Zigbee has a dual PHY layer, which uses a frequency bandwidth of 2.4 GHz and 868/915 MHz, direct sequence spread spectrum (DSSS) modem, and MAC of CSMA/CA. The Zigbee having a data transmission rate of 20 kbps to 250 kbps with a communication distance of 100 to 500 meters consumes low power less than 500 μW.

In the present invention, the HID lamp can be controlled through wireless frequency communications in an office, factory, or home on the basis of the aforementioned Zigbee-based techniques.

In the further description, the following listing of reference numbers identifies the corresponding elements and features in the drawings of FIGS. 1-5.

detecting a HID lamp state, an electronic switch unit 30 for controlling power applied to the HID lamp according to the signals outputted from the Zigbee wireless module 20 and the application board 25, and a power supply unit 15 for applying power to the Zigbee wireless module 20, the application board 25, and the electronic switch unit 30.

In addition, the magnetic ballast control system for a HID lamp of the present invention can further comprise an external sensor module 40 provided with one or more sensors for sensing illumination or the movement of people or things.

The Zigbee wireless module 20 includes a CPU control unit 22 being in charge of processing control signals of the HID lamp, for controlling the electronic switch unit 30 according to the signals from the management system module 5, application board 25, and external sensor module 40, a Zigbee communication unit 21 that bi-directionally and wirelessly communicates with the management system module 5 on the basis of Zigbee to transmit the information processed by the CPU control unit 22, and a rechargeable battery unit 23 for applying power to the CPU control unit 22 and the Zigbee communication unit 21.

The management system module 5 can include a Zigbee module 1 for supporting Zigbee communication protocols to control the wireless control module 10 through bi-directional communications with the wireless control module 10, a computer 2 for setting time to put out light and inputting control signals, and an RS-232 driver 3 for performing serial communications with the computer 2 and the Zigbee module 1.

In addition, if the management system module 5 is out of order, the wireless control module 10 can be automatically controlled, without the management system module 5, by a programming through a gateway. Basically, the wireless control module 10 operates in response to commands from the gateway while communicating with a gateway apparatus through a Zigbee wireless network. However, the magnetic

| | | |
|---|---|---|
| 1: Zigbee module | 2: computer | 3: RS-232 driver |
| 5: management system module | 10: wireless control module | |
| 15: power supply unit | 20: Zigbee wireless module | |
| 21: Zigbee communication unit | 22: CPU control unit | |
| 23: rechargebale battery unit | 25: application board | |
| 26: voltage detecting sensor | 27: current detecting sensor | |
| 28: temperature detecting sensor | 30: electronic switch unit | |
| 31~34: electronic switch dimming relay 1~4 | 35: antenna | |
| 36: discharge circuit | 40: external sensor module | |
| 41: illumination detecting sensor | 42: movement detection sensor | |
| 50: magnetic ballast unit | 51: discharge resistor | |
| 52~54 : condenser 1~3 | 55: automatic transformer | |
| 60: HID lamp | 90: choke coil | 95: igniter |

FIG. 1 is a view schematically showing the configuration of a ballast control system for a HID lamp using Zigbee according to the present invention. The ballast control system comprises a management system module 5 for outputting HID lamp control signals on the basis of Zigbee communications, a wireless control module 10 for controlling the HID lamp by bi-directionally communicating with the management system module 5 on the basis of Zigbee communications, and a magnetic ballast unit 50, provided with a plurality of power factor improving condensers or choke coils to be selected by the wireless control module 10, for stably supplying power.

The wireless control module 10 includes a Zigbee wireless module 20 for supporting Zigbee communications to transmit and receive control signals to and from the management system module 5 through bi-directional communications, an application board 25 provided with one or more sensors for ballast control system for a HID lamp of the present invention is configured to be able to directly receive commands from a server, and can control the magnetic ballast by outputting pulses at regular intervals using a self-equipped real-time clock (RTC).

The management system module 5 has an address of the Zigbee module 1 corresponding to each HID lamp. In order to control the HID lamp individually, the address of the Zigbee communication unit 21 that is desired to control the HID lamp is specified, and a control signal for controlling the specified HID lamp is inputted into the specified address. Then, bidirectional communications are performed between the Zigbee module 1 and the Zigbee communication unit 21, the Zigbee communication unit 21 corresponding to the address receives the signal, and the CPU control unit 22 of the Zigbee wireless module 20 provided with the corresponding Zigbee communication unit 21 controls the electronic switch unit 30. The electronic switch unit 30 cuts off power supplied to the HID lamp 60, and the HID lamp can be controlled by individually or collectively specifying the Zigbee communication unit 21 for controlling the HID lamp.

The CPU control unit 22 receives signals from the Zigbee communication unit 21, which receives control signals from the management system module 5, and controls the electronic switch unit 30. Further, the CPU control unit also can receive sensor signals and control signals from one or more sensors provided in the application board 25 and the external sensor module 40, and transfer to the electronic switch unit 30 according to the received sensor signals and control signals or send feedback signals to the management system module 5 through the Zigbee communication unit 21.

In addition, in the present invention, the rechargeable battery unit 23 provided in the Zigbee wireless module 20 can be used when power is not supplied to the Zigbee wireless module 20, such as in the case of a blackout.

Meanwhile, the application board 25 can be mounted with a voltage detecting sensor 26, a current detecting sensor 27, and a temperature detecting sensor 28. The voltage detecting sensor 26, current detecting sensor 27, and temperature detecting sensor 28 can detect voltage, current, and temperature of the magnetic ballast 50 and the HID lamp 60 and confirm failure of the magnetic ballast 50 and the HID lamp 60. That is, if changes of the voltage, current, or temperature of the ballast and the HID lamp are substantive, the application board sends a signal to the CPU control unit 22, and the CPU control unit 22 that receives the signal sends a control signal to the electronic switch unit 300 and cuts off power of the failed part.

The external sensor module 40 can be provided with an illumination detecting sensor 41 and an movement detection sensor 42. The illumination detecting sensor 41 and the movement detecting sensor 42 detect neighboring brightness or the movement of a human body. Detected corresponding signals are transferred to the CPU control unit 22 and processed by a program stored in the CPU control unit 22 according to the transferred corresponding signals. The processed signals are transferred to the electronic switch unit 30, and the electronic switch unit 30 can control illumination of the HID lamp according to the transferred signals.

In the present invention, illumination of the HID lamp is controlled such that the CPU control unit 22 receives a signal outputted from the Zigbee wireless module 20, the application board 25, or the external sensor module 40, and the signal is processed by the CPU control unit 22 and transferred to the electronic switch unit 30, and then the signal transferred to the electronic switch unit 30 determines the operation of a switch (a relay) of the electronic switch unit. The electronic switch unit 30 of the present invention controls illumination in association with the magnetic ballast for a HID lamp.

Figure 2:
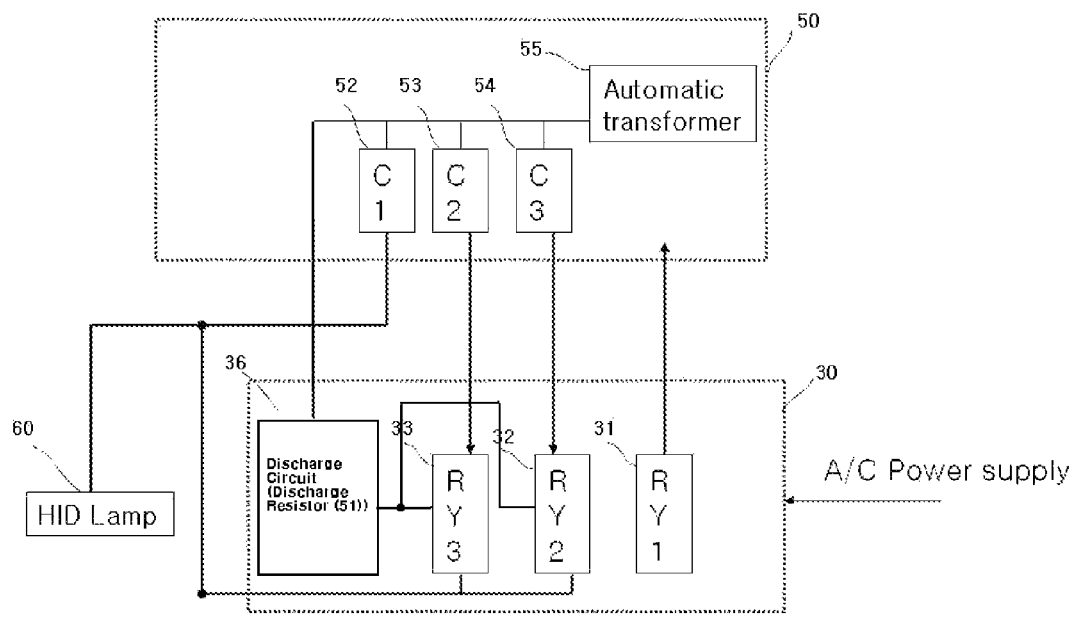
FIG. 2 is a view showing the wiring of the electronic switch unit and the constant power type magnetic ballast of the ballast control system for a HID lamp using Zigbee according to the present invention.

The magnetic ballast for a HID lamp can be generally divided into a constant power type magnetic ballast and a choke coil type magnetic ballast. First, in the constant power type magnetic ballast according to the present invention, as shown in FIG. 2, a plurality of power factor improving condenser and a resistor are connected in parallel in the location where autotransformer and condenser are attached.

The electronic switch unit 30 of the constant power type magnetic ballast uses electronic switches (relay switches). In the constant power type magnetic ballast, a first electronic switch dimming relay 31, a second electronic switch dimming relay 32, and a third electronic switch dimming relay 33, having a function of connection to the condensers are configured to control values of the power factor improving condensers. However, it is not limited to this, and a plurality of electronic switch dimming relays can be configured.

In the present invention, the discharge resistor 51 of the discharge circuit 36 discharges remaining currents that the condensers have while operating and prevents the lifespan of the electronic switch unit 30 from being shortened due to sparks generated by the remaining currents of the condensers.

Figure 3:
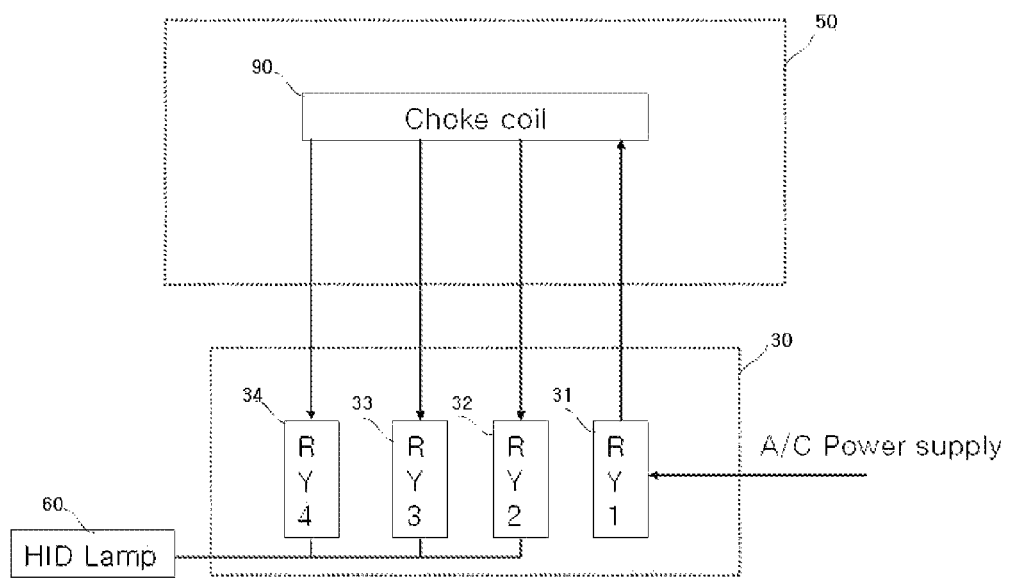
FIG. 3 is a view showing the wiring of the electronic switch unit and the choke coil type magnetic ballast of the ballast control system for a HID lamp using Zigbee according to the present invention.

Meanwhile, in the choke coil type magnetic ballast according to the present invention, a plurality of selection lines are connected to some points of a choke coil in the structure of a general-purpose choke coil type magnetic ballast. The connection of the choke coil is shown in FIG. 3.

The electronic switch unit of the choke coil type magnetic ballast according to the present invention uses electronic switches (relay switches). In the choke coil type magnetic ballast, a first electronic switch dimming relay 31, a second electronic switch dimming relay 32, a third electronic switch dimming relay 33, and a fourth electronic switch dimming relay 34, having a function of selecting an output line coming out from the choke coil of the ballast are configured. However, it is not limited to this, and a plurality of electronic switch dimming relays can be configured.

In the electronic switch unit 30 of the choke coil type magnetic ballast according to the present invention, when illumination of the HID lamp is controlled, the electronic switch dimming relay is momentarily disconnected from a switch contact point. Since initial lighting of the HID lamp is difficult, it is preferable to maintain disconnection on the output as short as possible. If the operating time of the switch is less than 5ms, the switch is inoperable, and if the operating time of the switch is longer than 50 ms, operating time of the switch is so long that the contact point is disconnected, and the HID lamp is difficult to be lit again. Therefore, as a switch of the electronic switch dimming relay according to the present invention, an electronic relay switch having an operating time of 5 to 50 ms is used.

EMBODIMENTS

The present invention will hereinafter be described in further detail by embodiments. However, it is to be understood that these embodiments can be modified into other various forms, and the scope of the present invention is not intended to be limited to such embodiments. Such embodiments are given to more fully describe the present invention for a person skilled in the art.

Embodiment 1

Illumination Control of a Constant Power Type Magnetic Ballast for a HID Lamp

When the value of the power factor improving condenser is 15 uF and outputted 100%, combination steps of the condensers are shown below.

1-1: Two step illumination control

Two power factor improving condensers having values of 10 uF and 5 uF respectively were combined.

TABLE 1

| Categories | 10 uF | 5 uF | Total |
|---|---|---|---|
| Turn on control illumination | used | used | 10 uF + 5 uF = 15 uF (output 100%) |
| | used | unused | Only use 10 uF = 10 uF (output 50%) |
| Turn off | unused | unused | Power off (output 0%) |

1-2: Four Step Illumination Control

Three power factor improving condensers having values of 10 uF, 3 uF, and 2 uF respectively were combined.

TABLE 2

| Categories | 10 uF | 3 uF | 2 uF | Total |
|---|---|---|---|---|
| Turn on | used | used | used | 10 uF + 3 uF + 2 uF = 15 uF (output 100%) |
| Control illumination | used | used | unused | 10 uF + 3 uF = 13 uF (output 80%) |
| Control illumination | used | unused | used | 10 uF + 2 uF = 15 uF (output 70%) |
| Control illumination | used | unused | unused | only use 10 uF = 10 uF (output 50%) |
| Turn off | unused | unused | unused | power off (output 0%) |

As described above, in the constant power type magnetic ballast for a HID lamp, illumination was basically controlled by providing a basic condenser directly connected to the HID lamp, together with small condensers whose capacity can be adjusted. As for the range of illumination control, it is set to output up to 100% of light from the maximum 50% after the lamp is lit 100%, followed by a stabilization period of 10 to 15 minutes, and then illumination is controlled by adjusting capacities of the condensers.

If the number of condensers having different capacities is two, the illumination can be controlled in two steps, if three, in four steps, and if four, in seven steps. The capacities of the condensers can be further divided, and the steps of illumination can be adjusted according to the number of condensers.

Embodiment 2

Illumination Control of a Choke Coil Type Magnetic Ballast for a HID Lamp

Figure 4:
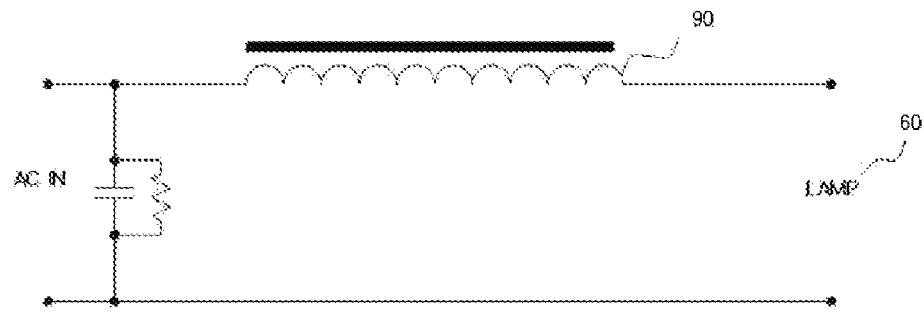
FIG. 4 is a view showing the circuit diagram of a general-purpose choke coil type magnetic ballast for a HID lamp.

Illumination control of the choke coil type magnetic ballast for a HID lamp was accomplished as shown in FIG. 4. In the circuit of a general-purpose choke coil type magnetic ballast for a HID lamp, a basic CCP (a choke coil+capacitor for improving a power factor+an igniter) is configured to connect output lines to an intermediate portion of the choke coil, and illumination of the HID lamp was controlled by adjusting the output capacity of the choke coil.

Figure 5A:
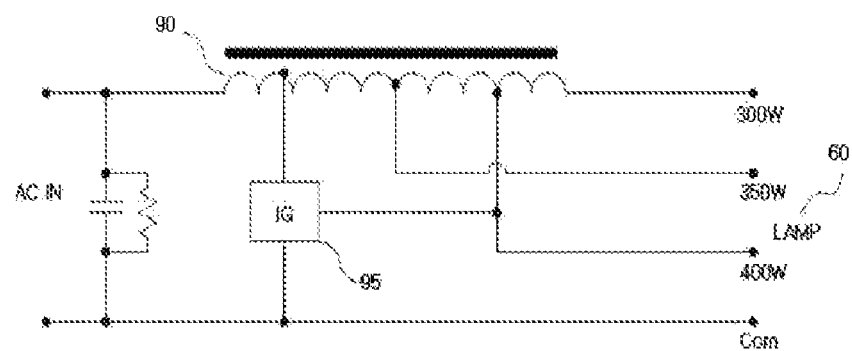
FIG. 5A is a view showing the circuit diagram of a choke coil type magnetic ballast with an embedded igniter according to the present invention and FIG. 5B is a view showing the circuit diagram of a choke coil type magnetic ballast with a plurality of choke coils according to the present invention.
Figure 5B:
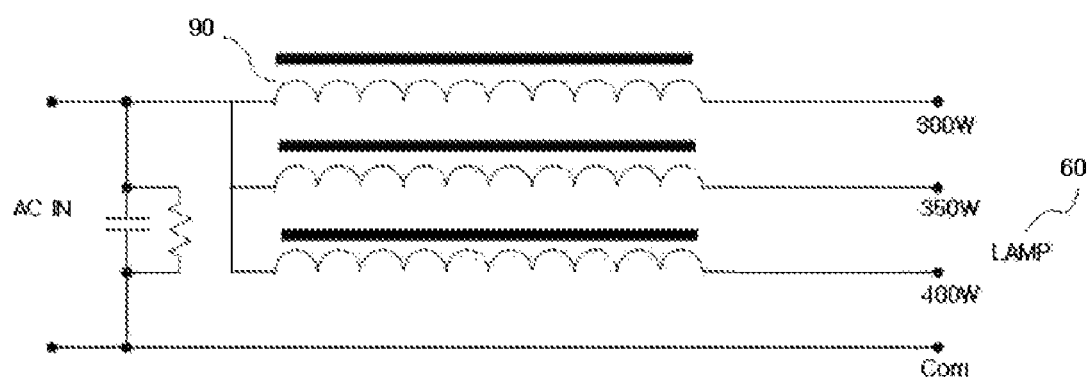

FIG. 5 is a view showing the circuit diagram of a choke coil type magnetic ballast with an embedded igniter according to the present invention, in which a HID lamp of 400 Watts was used. Illumination of the lamp was controllable as high as 300 Watts, and an output line of 350 Watts which is an intermediate value between the 400 Watts and the 300 Watts is connected, thereby constructing a three-step illumination control system.

Illumination control of the choke coil type magnetic ballast for a HID lamp according to the present invention is accomplished according to the number of output lines of the choke coil. If the number of output lines is two, the illumination can be controlled in two steps, if three, in three steps, and if four, in four steps. The output lines can be further divided, and the steps of illumination can be adjusted according to the number of output lines.

As described above in detail, in the present invention, there is provided a magnetic ballast control system for a HID lamp using Zigbee, which can remotely control the operation of the HID lamp and easily confirm failure of the HID lamp and a time to replace the HID lamp. According to the present invention, operational states of the HID lamp and the ballast can be bi-directionally controlled through the communication module, and failure in the operations of the HID lamp and the ballast is automatically detected and notified to users, thereby eliminating inconvenient confirming processes. Therefore, the magnetic ballast control system can be used in a variety of fields, such as street lamps, tunnel lamps, factory lamps, warehouse lamps, landscape illuminations, and the like. Further, illumination is controlled appropriately to situations, thereby obtaining considerable effects in saving energy.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A constant power type magnetic ballast control system for a HID lamp, the system comprising:

a management system module for outputting HID lamp control signals on the basis of Zigbee communications;

a wireless control module for controlling the HID lamp by bi-directionally communicating with the management system module, wherein the wireless control module includes a Zigbee wireless module for transmitting and receiving control signals to and from the management system module through bi-directional communications; an application board provided with one or more sensors for detecting a HID lamp state; an electronic switch unit for controlling power applied to the HID lamp according to the signals outputted from the Zigbee wireless module and the application board; and a power supply unit for supplying power to the Zigbee wireless module, the application board, and the electronic switch unit; and a constant power type magnetic ballast unit provided with a plurality of power factor improving condensers of different capacities to be selected by the wireless control module, for stably supplying power wherein the constant power type magnetic ballast unit controls illumination of the HID lamp according to the combination of power factor improving condensers of different capacities;

wherein the capacities of the plurality of condensors can be adjusted by the electronic switch unit, and the electronic switch unit is arranged to control illumination of the HID lamp by adjusting the capacities of the condensors to control power factor so that the illumination can be adjusted according to the number of condensers.

2. The constant power type magnetic ballast control system for a HID lamp according to claim 1, wherein the wireless control module further includes an external sensor module provided with one or more sensors for sensing illumination or the movement of people or things.

3. The constant power type magnetic ballast control system for a HID lamp according to claim 1, wherein the Zigbee wireless module includes:

a CPU control unit being in charge of processing control signals of the HID lamp, for controlling the electronic switch unit according to the signals from the management system module, application board, and external sensor module;

a Zigbee communication unit that bi-directionally and wirelessly communicates with the management system module on the basis of Zigbee to transmit the information processed by the CPU control unit; and a rechargeable battery unit for applying power to the CPU control unit and the Zigbee communication unit.

4. The constant power type magnetic ballast control system for a HID lamp according to claim 1, wherein the constant power type magnetic ballast unit is connected with discharge resistors.

5. A choke coil type magnetic ballast control system for a HID lamp, the system comprising:
- a management system module for outputting HID lamp control signals on the basis of Zigbee communications;
- a wireless control module for controlling the HID lamp by bi-directionally communicating with the management system module, wherein the wireless control module includes a Zigbee wireless module for transmitting and receiving control signals to and from the management system module through bi-directional communications; an application board provided with one or more sensors for detecting a HID lamp state; an electronic switch unit for controlling power applied to the HID lamp according to the signals outputted from the Zigbee wireless module and the application board; and a power supply unit for supplying power to the Zigbee wireless module, the application board, and the electronic switch unit; and
- a choke coil type magnetic ballast unit provided with a plurality of choke coils to be selected by the wireless control module, for stably supplying power, wherein the choke coil type magnetic ballast unit controls illumination of the HID lamp according to the combination of choke coils wherein the capacities of the plurality of choke coils can be adjusted by the electronic switch unit, and the electronic switch unit is arranged to control illumination of the HID lamp by adjusting the capacities of the choke coils to control power factor so that the illumination can be adjusted according to the number of choke coils.

6. The choke coil type magnetic ballast control system for a HID lamp according to claim 5, wherein the wireless control module further includes an external sensor module provided with one or more sensors for sensing illumination or the movement of people or things.

7. The choke coil type magnetic ballast control system for a HID lamp according to claim 5, wherein the electronic switch relay of the electronic switch unit operates at a time of 5~50 ms when the illumination of the HID lamp is controlled.

8. The choke coil type magnetic ballast control system for a HID lamp according to claim 5, wherein the Zigbee wireless module includes:
- a CPU control unit being in charge of processing control signals of the HID lamp, for controlling the electronic switch unit according to the signals from the management system module, application board, and external sensor module;
- a Zigbee communication unit that bi-directionally and wirelessly communicates with the management system module on the basis of Zigbee to transmit the information processed by the CPU control unit; and
- a rechargeable battery unit for applying power to the CPU control unit and the Zigbee communication unit.

9. The choke coil type magnetic ballast control system of claim 5, wherein the plurality of choke coils comprises choke coils of different capacities.

* * * * *

UNITED STATES PATENT AND TRADEMARK OFFICE
CERTIFICATE OF CORRECTION

PATENT NO. : 7,656,097 B2
APPLICATION NO. : 11/688254
DATED : February 2, 2010
INVENTOR(S) : Joong-Kwen Choi It is certified that error appears in the above-identified patent and that said Letters Patent is hereby corrected as shown below:

Title Page;
Page 1, first column, before Int. Cl., add -- (30)   Foreign Application Priority Data   Feb. 16, 2007 (KR) ............. 10-2007-0016657 --.

Column 8, line 30, "Sms" should be -- 5 ms --.

Signed and Sealed this

First Day of June, 2010

David J. Kappos
*Director of the United States Patent and Trademark Office*